United States Patent

[11] 3,537,374

[72] Inventor Gerald Lee Jenkins
Rochester, New York
[21] Appl. No. 746,687
[22] Filed July 22, 1968
[45] Patented Nov. 3, 1970
[73] Assignee Eastman Kodak Company
Rochester, New York
a corporation of New Jersey

[54] CAMERA EXPOSURE CONTROL
9 Claims, 1 Drawing Fig.
[52] U.S. Cl. .................................................. 95/64,
95/10, 352/72, 352/141
[51] Int. Cl. ...................................................... G03b 7/08,
G03b 19/18
[50] Field of Search ........................................... 352/141,
72, 78; 95/106, 64/(D)

[56] References Cited
UNITED STATES PATENTS
| | | | |
|---|---|---|---|
| 3,312,158 | 4/1967 | MacMillin et al. ............. | 352/78X |
| 3,314,344 | 4/1967 | Annyl et al. .................... | 352/72X |
| 3,444,798 | 5/1969 | Mayr et al. ...................... | 352/141X |

Primary Examiner—Norton Ansher
Assistant Examiner—Joseph F. Peters, Jr.
Attorneys—Robert W. Hampton and Daniel E. Sragow ABSTRACT: In order to avoid underexposure when photographing scenes having high background illumination with film having relatively low sensitivity, the minimum exposure is controlled, in an automatic exposure control, in response to the film sensitivity coding on a film cartridge. A film speed notch-sensing member senses a notch on the film cartridge which is indicative of the speed of the film contained therein. The above member controls a movable stop member which in turn limits the diaphragm blade movement which is automatically positioned by an exposure control circuit.

Patented Nov. 3, 1970
3,537,374
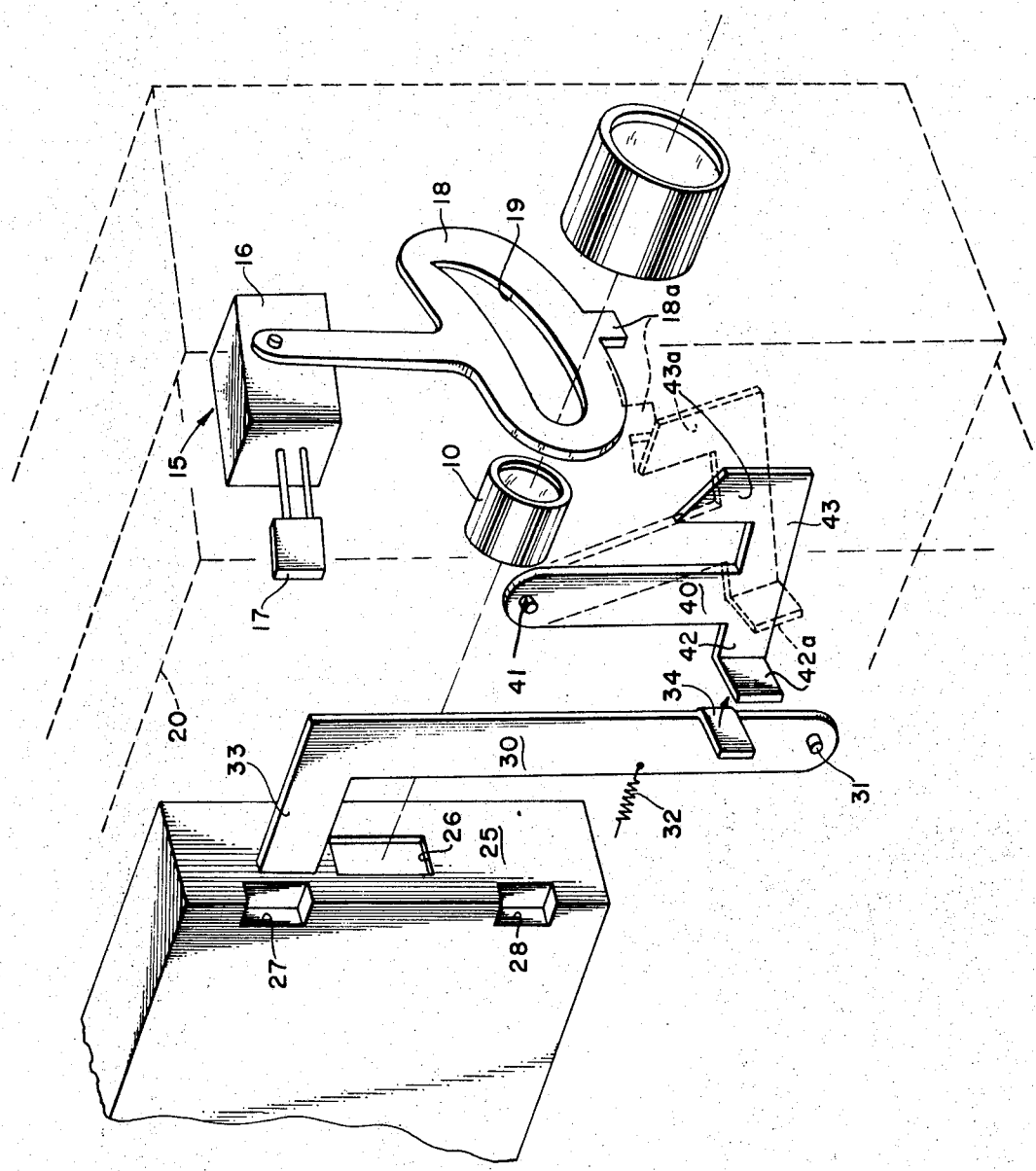
GERALD L. JENKINS
INVENTOR
BY
ATTORNEY

CAMERA EXPOSURE CONTROL

BACKGROUND OF THE INVENTION

1. Field of the Invention

The present invention relates to film-cartridge-loaded cameras of the type having automatic exposure control systems incorporated therein. More particularly, this invention relates to a camera mechanism which operates in response to film cartridge notch encoding so as to vary exposure parameters of the camera in accordance with film sensitivity.

2. Description of the Prior Art

Conventional photoelectric exposure control systems used in cameras for varying exposure parameters thereof (e.g. shutter speed and/or lens aperture) in accordance with the field brightness of the scene of photographic interest have, in general, wide angular fields of view. That is to say, the photosensitive element to which the exposure control system responds is generally arranged in the camera housing so as to view the subject matter of interest through a relatively large field stop, or alternatively, through a wide-angle lens. The basic reason for this arrangement stems simply from the fact that the sensitivity of conventional nonsophisticated photosensitive elements of the type adapted for use in moderately priced cameras is insufficient to permit acceptable system performance when the field of view is comparatively narrow. In other words the low sensitivity of the photosensitive element indicates the use of a wide field of view in order that a greater amount of light may be directed on the element so as to raise its electrical response to an operable level.

Generally the subject matter of photographic interest comprises only a small portion of the field of view of the exposure control system. Since the photosensitive element in such a system is usually not provided with means for discriminating between background and subject brightness, the light issuing from all portions of the field of view becomes integrated by the photosensitive element and an output is provided which is merely representative of the average scene brightness of the entire field of view of the system. As is readily apparent, when the background and subject are of comparable brightness, both will be properly exposed in the photographic record. However, when there is a substantial difference between background and subject brightness, the former tends to overshadow the latter due to its relative size, thereby causing the exposure control system to be "fooled" and thus produce an output more representative of the background brightness than subject brightness.

It is well known, from empirical data, that the field brightness of common subjects of photographic interest rarely exceeds a value of approximately 2,000 foot-lamberts, even under the brightest natural lighting conditions. Thus, using this value in the standard exposure equation, $$A^2/T = BS/K$$

where A is the $f$/number of the picture taking lens, T is the exposure time in seconds, B is the field brightness in foot-lamberts, S is the American Standards Association film-speed value, and K is an exposure constant for reflected-light-type meters, the value of which constant depends on the specific parameters of the photometric system employed, the minimum aperture size to which the picture-taking lens must be reduced so as to properly expose a subject of maximum brightness (2,000 foot-lamberts) may be readily computed as a function of film speed. For instance, assuming an exposure time of one thirtieth second and an exposure constant of 4.75 (a reasonable average value for conventional exposure control systems), the minimum aperture size to which the picture-taking lens must be reduced so as to properly expose film of ASA 25 to the maximum subject brightness is $f$/19. Similarly, when film of ASA 100 is employed, the minimum aperture size may be computed to be $f$/36, assuming the same exposure time and exposure constant.

On some occasions, such as when the sun is reflected or is shining directly into the field of view of the exposure control system, the brightness of the background will far exceed 2,000 foot-lamberts and thereby cause the average brightness of the entire field of view to be in excess of 2,000 foot-lamberts. On such occasions, the exposure control systems will tend to reduce the aperture of the picture-taking lens below the size necessary to properly expose the subject of interest, thereby resulting in an underexposure of such subject. Such underexposure is obviously undesirable.

SUMMARY OF THE INVENTION

In accordance with the present invention a mechanism is provided which automatically prevents the exposure control system from reducing the size of the picture-taking lens below that minimum value which will produce proper exposure of film of a specific film speed at the maximum anticipated subject brightness. The mechanism is designed so as to be responsive to the notch encoding on film cartridges which is indicative of the speed of the film contained thereby.

It is, therefore, an object of the invention to provide a means for preventing underexposure of subjects of photographic interest when the background against which such subjects are situated is of a brightness substantially in excess of the maximum anticipated brightness of the subject of interest.

Another object of this invention is to provide a camera mechanism, operable in response to the film speed notch encoding on film cartridges, for overriding the output of a camera exposure control system when the average scene brightness detected by such system exceeds a predetermined maximum value.

Other objects of the invention will be apparent from the following description with reference to the accompanying drawing.

BRIEF DESCRIPTION OF THE DRAWING

The drawing is a perspective view of a camera housing in phantom showing a camera mechanism and a coded film cartridge according to the invention.

DESCRIPTION OF THE PREFERRED EMBODIMENT

Referring to the drawing, a camera has a picture-taking lens 10, exposure control system 15, and chamber means 20 for receiving a film cartridge 25. Basically, the exposure control system 15 comprises an exposure meter 16 (shown schematically) which is operably controlled by a photosensitive element 17, and a diaphragm vane 18 which is pivotally coupled with the exposure meter 16 and is movable in accordance with the quantity of light-striking photosensitive element 17. Diaphragm vane 18 is provided with an elongated tapered aperture 19 which is arranged on the optical axis of lens 10 so as to vary the amount of light passing through lens 10 in accordance with the level of field brightness. Film cartridge 25 is provided with aperture 26 through which film may be exposed to light passing through lens 10, and is further provided with notch encodings 27, 28 which are indicative of the speed and spectral sensitivity, respectively, of the particular film contained by the cartridge. Generally notch 27 varies in length between cartridges depending on the speed of the film contained thereby and the presence or absence of notch 28 is indicative of the spectral sensitivity of the film, the notch being present when the film contained by cartridge 12 is of the type adapted to be exposed to artificial light.

Basically, the invention comprises a film speed notch-sensing member 30 and a movable stop member 40. Notch-sensing member 30 is pivotally mounted to the camera housing on shaft 31 and is biased by spring 32 to rotate thereabout in a counterclockwise direction toward cartridge chamber 20. An abutment (not shown) is provided for positioning member 30 as shown in the drawing. Notch-sensing member 30 is provided with a horizontally extending notch feeler 33, which is arranged to cooperate with film speed-notch coding 27, and a perpendicularly extending lug 34. Stop member 40 is pivotally mounted to the camera housing on shaft 41 and is provided with a pair of laterally extending arms 42 and 43 which are arranged to cooperate with lug 34 of member 30 and with lug 18a of diaphragm vane 18, respectively. Arm 42 is provided with a lug 42a which is arranged to interact with lug 34 when notch-sensing member 30 is caused to pivot in a clockwise direction by cartridge 25. By this arrangement, stop member 40 is caused to pivot in a counterclockwise direction about shaft 41 when cartridge 25 contains film having a speed which requires the movement of diaphragm vane 18 to be limited so as to provide proper exposure when a subject of maximum brightness is to be photographed. Arm 43 is provided with an upper extension 43a which is arranged to engage lug 18a of diaphragm vane 18, and thereby stop the pivotal movement of diaphragm vane 18 in such a position as to provide the desired minimum exposure aperture for the particular speed film being used.

The invention operates in the manner hereinafter described. When film cartridge 25 contains film having a speed which requires the output of the exposure control system to be overridden, notch 27 will be of a length which precludes entrance therein of notch feeler 33. As cartridge 25 is inserted into the camera cartridge chamber 20, notch feeler 33 will abut the forward face of cartridge 25 and thereby impart a clockwise pivotal movement in notch-sensing member 30. This movement causes lug 34 to engage lug 42a of stop member 40 which, in turn, imparts a counterclockwise movement in stop member 40. Subsequent to such counterclockwise movement, stop member 40 is caused to come to rest in a position such that the upper extension 43a thereof is in the path of travel of lug 18a of diaphragm vane 18. Thus, when the average field brightness exceeds the maximum anticipated level of subject brightness, lug 18a will impinge upon extension 43a and come to rest. By this arrangement, the output of the exposure control system is overridden and the aperture size of lens 10 is prevented from being reduced to a level which would result in underexposure of the subject matter of interest. When cartridge notch 27 is of a size indicative of a film speed which does not require the use of stop member 40, notch feeler 33 will be permitted to enter notch 27 and thereby permit members 30 and 40 to remain in the position shown. In this position diaphragm vane 18 is free to pivot over its maximum range, and thereby reduce the f/number of taking lens 10 to a value governed by the extreme tapered end of aperture 19.

The invention has been described in considerable detail with particular reference to a preferred embodiment thereof, but it will be understood that variations and modifications can be effected within the spirit and scope of the invention as described hereinabove and as defined in the appended claims.

I claim:

1. In a photographic camera having means for forming an image of a scene on a photosensitive surface and means for receiving a film cartridge having a tactile discontinuity thereon representative of film speed, the combination comprising:
   a. an exposure control device having a light-sensitive member disposed for illumination by light from said scene and having a diaphragm vane movable under control of said light-sensitive member to any of a plurality of positions as a function of the brightness of said scene, said vane having an elongated tapered aperture therein movable relative to said image-forming means for regulating the admission of scene light to said photosensitive surface; and
   b. means responsive to the film cartridge discontinuity for limiting movement of said diaphragm vane relative to said image-forming means so as to prevent further attenuation of scene light reaching said photosensitive surface when said scene light exceeds a predetermined maximum value.

2. The invention according to claim 1 wherein said means for limiting movement of said diaphragm vane comprises a movably mounted discontinuity-sensing member which is biased by spring means toward a first position engaging said discontinuity when said cartridge is received by said chamber means.

3. The invention according to claim 1 wherein said means for limiting movement of said diaphragm vane comprises a pivotally mounted discontinuity-sensing member which is biased by spring means to pivot in a direction to engage a cartridge discontinuity when the cartridge is received by said chamber means.

4. The invention according to claim 3 wherein said means for limiting movement of said diaphragm vane further comprises a movably mounted stop member arranged to engage said discontinuity-sensing member when the latter is caused to pivot by the film cartridge discontinuity, thereby causing said stop member to be moved into the path of pivotal movement of said diaphragm vane so as to prevent further attenuation of scene light reaching said photosensitive surface when said scene light exceeds a predetermined value.

5. A camera comprising:
   a. a picture-taking aperture;
   b. an exposure control system including means for varying the size of said picture-taking aperture over a predetermined range of aperture sizes in accordance with scene brightness;
   c. means for receiving a film cartridge having a tactile discontinuity thereon representative of the speed of the film contained thereby; and
   d. means responsive to said film cartridge discontinuity for varying the range over which said picture-taking aperture may be varied.

6. The invention according to claim 5 wherein:
   a. the means for varying said aperture size comprises a diaphragm vane having an elongated tapered aperture therein, said vane being movably mounted so as to permit movement of said tapered aperture relative to said picture-taking aperture whereby said picture-taking aperture size may be varied in accordance with field brightness; and
   b. said means for varying the range over which said picture-taking aperture may be varied comprises discontinuity-sensing means movable into the path of movement of said diaphragm vane in response to a selected film speed discontinuity whereby the range over which said diaphragm vane may vary said picture-taking aperture size is limited when the average field brightness of the scene of photographic interest exceeds a predetermined value.

7. A camera comprising:
   a. means for receiving a film cartridge which has a tactile discontinuity a dimension of which is representative of the sensitivity of the film contained therein;
   b. an exposure control which varies the exposure of the film in accordance with scene illumination, said exposure control being operable in a certain range;
   c. means for sensing said dimension of said tactile discontinuity of the cartridge; and
   d. means coupled to said sensing means for varying the range of said exposure control in response to a predetermined dimension of the tactile discontinuity.

8. A camera comprising:
   a. means for receiving a film cartridge which has a tactile discontinuity a dimension of which is representative of the sensitivity of the film contained therein;
   b. an exposure control which is adapted to vary exposure of the film in accordance with scene illumination, said exposure control including variable means for preventing said exposure control from attenuating exposure of the film below a predetermined minimum;
   c. means for sensing said dimension of said tactile discontinuity of the cartridge; and
   d. means coupled to said sensing means for varying said preventing means in response to a predetermined dimension of the tactile discontinuity.

9. In a camera having an objective for forming an image of a scene in a primary image plane and means for receiving a film cartridge for locating film in the cartridge substantially in the primary image plane, the film cartridge having indicia representative of film speed, the combination comprising:

a. an exposure control apparatus including a photoresponsive member disposed for illumination by light from a scene, and having an adjustable exposure control member movable under control of the photoresponsive member for variably attenuating the amount of scene light transmitted to the primary image plane;

b. means for sensing indicia on such a film cartridge loaded in the camera; and c. means associated with said sensing means for limiting the movement of said exposure control member in response to the sensed indicia to limit attenuation of scene light by the exposure control member when the scene light exceeds a predetermined maximum value.